Sept. 12, 1950 — W. C. GREGORY — 2,521,846
COMPOSITE GLASS AND METAL ARTICLE
Original Filed July 26, 1944

INVENTOR,
Waylande C. Gregory
BY
ATTORNEYS

Patented Sept. 12, 1950

2,521,846

UNITED STATES PATENT OFFICE 2,521,846

COMPOSITE GLASS AND METAL ARTICLE

Waylande C. Gregory, Bound Brook, N. J.

Original application July 26, 1944, Serial No. 546,609. Divided and this application February 8, 1950, Serial No. 143,083

4 Claims. (Cl. 49—92.5)

This invention relates to composite articles, and in particular to such articles embodying areas or portions of glass, of suitable color or colors, provided with internal fractures forming light-reflecting facets or surfaces imparting to the aforesaid areas or portions live gem-like or jewel-like properties of great decorative, artistic and aesthetic value.

It is the object of this invention to provide new and improved articles of the class described above wherein the internally fractured areas or portions are secured to bases or frames of metal providing added strength and protection therefor and/or facilitating fabrication of other objects or articles made up of a plurality of such composite articles as units.

It is a further object of this invention to provide such articles which possess strength and ruggedness sufficient to fit them for numerous and widely varied uses functionally, in addition to their decorative utility.

This application is a divisional application of my copending application Serial No. 546,609, filed July 26, 1944.

These and other objects and advantages of the invention will clearly appear from the following description taken with the accompanying drawing and the appended claims.

In my application Serial No. 426,584, filed January 13, 1942, which matured in U. S. Letters Patent No. 2,357,399, granted September 5, 1944, disclosure is made of composite articles constructed of glass and ceramic material wherein the glass is provided with internal fractures forming light reflecting facets haphazardly arranged and extending generally depthwise and imparting great beauty and aesthetic appeal to the articles by reason of the simulation, by the glass, of sheets of gems or jewels. Methods of manufacturing such articles are also described and claimed therein. The invention herein disclosed extends the principles of the invention described and claimed in the aforesaid application to other articles and uses.

Figure 1:
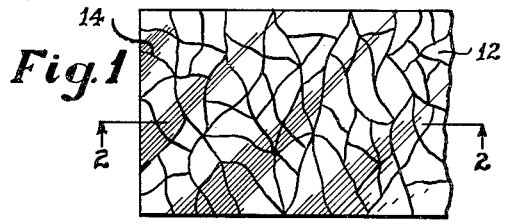
Fig. 1 is a plan view of a composite article comprising a composite glass and metal panel, illustrative of one application of this invention.
Figure 2:
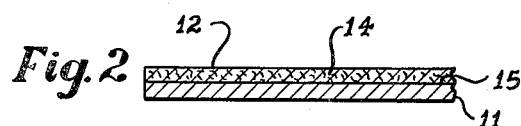
Fig. 2 is a section taken substantially on the line 2—2 in Fig. 1.
Figure 3:
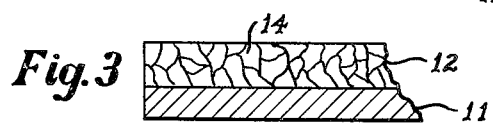
Fig. 3 is an enlarged fragmentary view, in section, of the structure shown in Figs. 1 and 2, with cross-hatching omitted from the glass layer or portion in the interest of clearness.

As shown in Figs. 1-3, an article embodying the principles of this invention may comprise a metal support or backing sheet or panel 11 having bonded or fused thereto a substantially coextensive layer 12 of internally fractured vitreous material or glass of substantial depth, i. e., substantially thicker than a glaze, enamel or other coating. The fractures 14 (Fig. 3) are haphazardly arranged and form light reflecting facets within the glass layer 12 which impart to the visible surface of the article the apearance of an expanse of gems or jewels of great richness and aesthetic appeal. The glass may be of any color, either uniform throughout or varied throughout, as desired. Such an article is suitable for use as a tile or panel where the artistic or decorative gem-like qualities thereof are desirable but where the convenience of metal fabrication is also desired.

Figure 4:
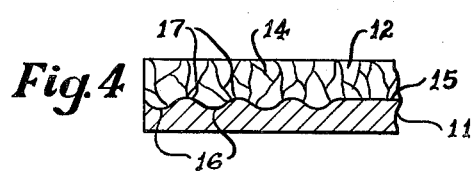
Fig. 4 is a view, similar to Fig. 3, of a modification of the structure shown in Figs. 1, 2 and 3.
Figure 11:
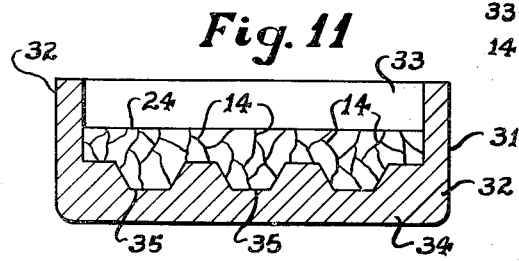
Fig. 11 is a section taken substantially on the line 11—11 of Fig. 10.

While the interface or bonding surface 15 of the article illustrated in Figs. 1-3 is planar, it may be varied by provision of alternate grooves 16 and lands 17 (Fig. 4) or the like, for varying the depth of the sheet or layer of internally fractured glass locally and for controlling the size and disposition of the "crystals" formed by the fractures, which extend generally depthwise of the glass layer and which tend to arrange themselves perpendicular to the interface (see Fig. 11).

Figure 5:
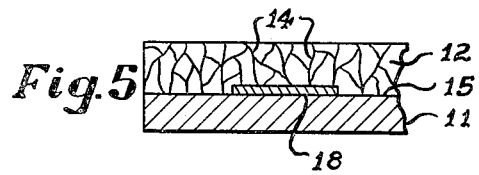
Fig. 5 is a view, similar to Figs. 3 and 4, of a second modification embodying an inset or embedded design element.

Likewise, suitable ornamental or decorative elements or devices 18 may be interposed substantially at the bonding line or plane 15, between the metal base or base member 11 and the internally fractured sheet or layer 12 as shown in Fig. 5, or, as will be readily understood, the ornaments or devices 18 may lie completely within the body of the sheet or layer 12, out of contact with the base or base member 11. Since these ornaments or decorative devices are visible only through the sheet or layer 12 with its light deflecting facets or surfaces 14 and its color or colors, many extremely interesting, varied aesthetic effects may be secured by their use as described above.

Figure 6:
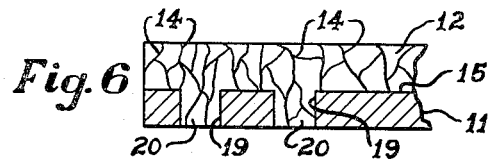
Fig. 6 is a view of another modification embodying lense forming areas of glass of thickness coextensive with the thickness of the composite article.

A further variation in the effect secured by this composite metal and internally fractured glass construction may be achieved by interrupting the continuity of the base or base member 11 at desired intervals or locations by the provision of apertures such as 19 (Fig. 6) whereby portions of the layer 12 are made to extend, at suitable locations, from side to side of the composite article. The lenses 20 formed by the glass within the apertures 19 form light transmitting extensions of the sheet or layer proper 12 making possible the transmission of light into, and through, the layer or sheet 12. Any desired symbols, ornaments or devices may be outlined by these lenses 20 by suitable location of the apertures 19 and formation of the light transmitting lenses 20 therein, as hereinafter described.

Figure 7:
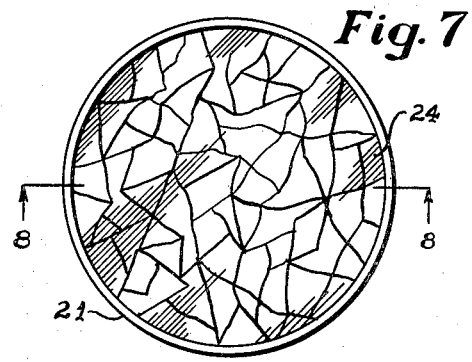
Fig. 7 is a plan view illustrating application of the principles of this invention to a walled vessel or article, such as a tray.
Figure 8:
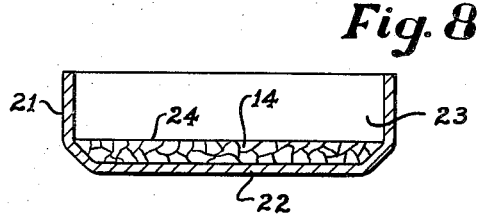
Fig. 8 is a section taken substantially on the line 8—8 of Fig. 7.

While the above description relates to substantially flat, sheetlike articles, it is of course to be understood that the principles of this invention are adapted also to trays, bowls, cups and the like such as the illustrative vessel shown in Figs. 7 and 8. That vessel comprises a cup or tray 21 of metal, with a base or bottom wall 22 and continuous flange or side wall 23. Within the recess formed by the bottom wall 22 and side wall 23, a layer or sheet 24 of internally fractured glass of substantial thickness or depth (corresponding to the above described sheet or layer 12) is fused or bonded to the bottom portion of the interior of the vessel 21.

Figure 9:
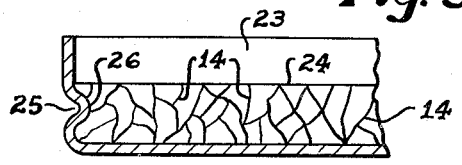
Fig. 9 is a fragmentary view in section illustrating the provision of mechanical interlock between the glass and metal for additional security of attachment.

In order to enhance the security of attachment of the sheet or layer 24 to the vessel 21, the sidewall or flange 23 may be grooved (Fig. 9) to form an inwardly directed annular flange 25 engaging a complementary groove 26 formed in the sheet or layer 24 during fusing or bonding. Likewise, when this construction is used the layer or sheet 24 may be formed (with or without its internal fractures) independently from the vessel or body 21, with the peripheral groove or channel 26 formed therein, then inserted in the interior of the vessel 21 before the flange 25 is formed therein, and the flange 25 thereafter formed in the sidewall 23, for instance, by spinning. The latter step conforms the inwardly directed flange 25 so closely with the groove 26 in the sheet or layer 24 as firmly and securely to connect the glass sheet or layer 24 and the metal vessel 21 together.

Figure 10:
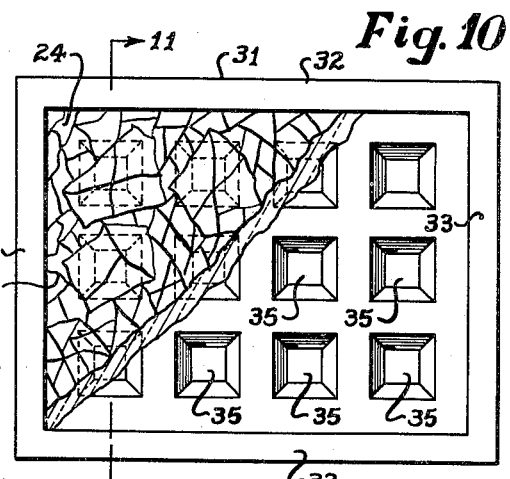
Fig. 10 is a plan view, partly in section, illustrating application of the principles of this invention to a decorative panel for use, for instance, for constructional purposes.

While the object or vessel 21 (Figs. 7-9) is of relatively light construction capable of production by stamping, drawing, and/or spinning, the principles of the invention are readily adaptable to generally similar metal bodies of substantially greater wall thickness and weight such as the body of the rectangular tray 31 shown in Figs. 10 and 11. The side walls 32 and end walls 33 are of substantial thickness as is also the bottom wall 34, and the latter wall 34 is provided with deep spaced recesses 35 of any suitable size, shape and spacing forming spaced areas of greater depth than the depth of the sheet or layer 24 as a whole and the depth of these areas being varied because of the inclination of the sides of the recesses 35. In other words, the internally fractured glass in the recesses 35 forms a series of geometric extensions of the sheet proper 24.

Since the fractures or facets 14 extending from the back or unexposed surfaces of the glass arrange themselves substantially normal to the underlying metal surfaces, generally speaking, the angles of the light reflecting surfaces or facets formed thereby may be rather closely controlled by the use of such recesses etc., to vary the size of the "crystals" formed by the fractures 14 which size varies, generally, with the depth of the glass as well as with the angles of the facets thereof as described above.

Figure 12:
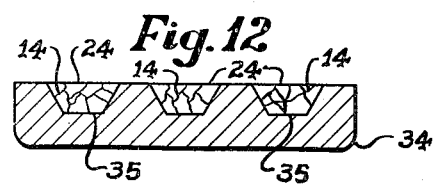
Fig. 12 is a view, similar to Fig. 11, of another modification having alternate metal and internally fractured glass surface areas.

As shown in Fig. 12, the walls 32 and 33 may be omitted from the tray 31 and a structure formed which is particularly adapted to use as a tread member, block, or tile and which comprises a metal body 34 provided with spaced recesses 35 containing decorative bodies 24 of internally fractured glass with gem-like light reflecting properties. In this article, a part of the tread surface is glass but the surrounding surfaces are metal.

It will, of course, be understood that the composite bodies described above may be provided with any suitable protective coatings such as glazes, lacquers, clear varnishes when desired.

It is, likewise, to be understood that the use of suitable glass-metal bonding aids such as ground coats or fluxes applied to the bonding surfaces or interfaces is comprehended where the nature of the materials makes such use desirable or necessary.

Where it is desired to produce an article embodying one or more design elements at or adjacent the interface such as 18 (Fig. 5) this element may be applied to the base 11 before it is heated or inserted in the glass thereon while the glass is molten.

While many metals may be used in forming the metal base member, backing or sheet to which the glass layer is attached, I prefer to use those having fusion temperatures above 1200 degrees F., more preferably above 1500 degrees F., in view of the comparative fusing points of various glasses and metals as set forth in the following tables of approximate fusion points or temperatures.

| Metal: | Fusion point, degrees F. |
| --- | --- |
| Aluminum | 1217.7 |
| Silver | 1760.9 |
| Brass | 1870.0 |
| Gold | 1945.5 |
| Copper | 1981.4 |
| Cast iron (white) | 2075.0 |
| Cast iron (grey) | 2230.0 |
| Steel | 2372.0 |
| Wrought iron | 2732.0 |
| Nickel | 2646.0 |
| Platinum | 3191.0 |

It will be apparent from the comparatively high melting points of the metals, such as those indicated above, as compared with the low melting point of the glass layer, that none of the metals reaches the fusing point and that accordingly no metal enters the cracks or fractures of the glass layer.

From the above description it will clearly appear that I have provided new and improved composite articles of glass and metal embodying great decorative value and having widely varying applications, which are susceptible of production with ease and economy from relatively cheap materials.

It is of course to be understood that the above description is merely illustrative and in nowise limiting and that I desire to comprehend within this invention such modifications as are included within the scope of the appended claims.

Having thus described my invention what I claim as new and desire to secure by Letters Patent is:

1. A composite glass and metal article comprising a metal base provided with a recess therein and having a glass layer, said glass layer being substantially thicker than a glaze, said glass layer being provided with internal fractures forming individually perceptible light reflecting facets extending depthwise of the layer from the glass surface to said base and being integral with said base, said fractures being entirely free of metal from said glass surface to said base.

2. An article in accordance with claim 1 in which said metal base has a continuous side wall.

3. An article in accordance with claim 2 in which the side walls are provided with a continuous groove.

4. An article in accordance with claim 2 in which the metal base is provided with a series of depressions in said recess which extend only partly through the surface of the metal base.

WAYLANDE C. GREGORY.

REFERENCES CITED

The following references are of record in the file of this patent:

UNITED STATES PATENTS

| Number | Name | Date |
| --- | --- | --- |
| 1,594,940 | Goodridge | Aug. 3, 1926 |
| 1,646,468 | Warga | Oct. 25, 1927 |
| 2,071,294 | Branson | Feb. 16, 1937 |
| 2,073,254 | Redman | Mar. 9, 1937 |
| 2,357,399 | Gregory | Sept. 5, 1944 |

FOREIGN PATENTS

| Number | Country | Date |
| --- | --- | --- |
| 522 | Great Britain | 1899 |